(12) United States Patent
Chen

(10) Patent No.: US 7,315,457 B1
(45) Date of Patent: Jan. 1, 2008

(54) MOTHERBOARD FIXING DEVICE

(75) Inventor: Deng-Hsi Chen, Keelung (TW)

(73) Assignee: Lian Li Industrial Co., Ltd., Keelung (TW)

( * ) Notice: Subject to any disclaimer, the term of this patent is extended or adjusted under 35 U.S.C. 154(b) by 0 days.

(21) Appl. No.: 11/607,058

(22) Filed: Dec. 1, 2006

(51) Int. Cl.
*H05K 7/14* (2006.01)

(52) U.S. Cl. .............. 361/801; 361/759; 361/726; 361/747; 361/679; 312/223.2

(58) Field of Classification Search ......... 361/683, 361/679, 801, 796, 726, 732, 740, 747, 759; 312/223.2, 223.3; 174/521
See application file for complete search history.

(56) References Cited

U.S. PATENT DOCUMENTS

| | | | | |
|---|---|---|---|---|
| 5,975,659 A * | 11/1999 | Yang et al. | ............. | 312/223.2 |
| 6,257,682 B1 * | 7/2001 | Liu et al. | ................. | 312/223.2 |
| 6,373,692 B1 * | 4/2002 | Cheng | ........................ | 361/683 |
| 6,381,138 B1 * | 4/2002 | Chen | .......................... | 361/724 |
| 6,382,744 B1 * | 5/2002 | Xiao | ....................... | 312/223.2 |
| 6,398,325 B1 * | 6/2002 | Chen et al. | .............. | 312/223.2 |
| 6,407,912 B1 * | 6/2002 | Chen et al. | ................. | 361/683 |
| 6,542,356 B2 * | 4/2003 | Gan | .......................... | 361/683 |
| 6,646,892 B1 * | 11/2003 | Hsu | .......................... | 361/818 |
| 6,775,144 B2 * | 8/2004 | Gan et al. | .................... | 361/727 |
| 6,826,039 B2 * | 11/2004 | Chen | .......................... | 361/679 |
| 6,935,661 B1 * | 8/2005 | Farnsworth et al. | ........ | 292/162 |
| 7,016,187 B2 * | 3/2006 | Sura et al. | .................. | 361/683 |

* cited by examiner

*Primary Examiner*—Dean A. Reichard
*Assistant Examiner*—Dameon E. Levi
(74) *Attorney, Agent, or Firm*—Troxell Law Office, PLLC

(57) ABSTRACT

A motherboard fixing device that is installed within a case of a computer host computer, and, after installing a motherboard to a retaining panel, enables rapid assembly of the entire integrated motherboard and retaining panel within the case or extraction and replacement of the motherboard. Moreover, the present invention effectively avoids inadvertent damage to the motherboard when installing within the small space of a case.

3 Claims, 6 Drawing Sheets

MOTHERBOARD FIXING DEVICE

BACKGROUND OF THE INVENTION (a) Field of the Invention

The present invention relates to a motherboard fixing device which enables a computer motherboard to be mounted thereon, and more particularly to a motherboard fixing device that, after mounting a motherboard thereto, a disposition method of the entire motherboard fixing device enables achieving rapid assembly.

(b) Description of the Prior Art

When assembling a host computer, an installer first fixedly installs a motherboard within a case of host computer, then related interface cards are inserted according to the requirements of user specifications, and after completing insertion of each of the interface cards, related wiring and transmission flat cables are connected to insertion slots of the corresponding interface cards according to power supply and transmission requirements. Finally, after testing for normal operation of the host computer, assembly of the complete is complete.

Referring to FIG. 1, which shows a schematic view of an embodiment depicting a prior art host computer, wherein a host computer 10 mainly includes a case 101 that serves to provide space for primarily mounting various structural components. Moreover, the case 101 is further provided with the function to protect each of the structural components. In addition, a front surface of the case 101 is the operation panel which enables installing a plurality of operating keys, and provides insertion slots for peripheral equipment. FIG. 1 further shows that the interior of the case 101 in general provides a flat surface that enables assembling a motherboard 102 thereto. Regarding computer cases of prior art, because the side portion is provided with a relatively large area which enables assembling the large motherboard 102, thus, the assembled motherboard 102 is mainly positioned close to a side portion of the case 101. However, during the course of assembling the host computer 10, in general, after an installer dismantles a cover panel of one side of the case 101, then the motherboard 102 is installed within the case 101, and because of the restricted interior space of the case 101, the installer must be extremely careful during assembly in order to avoid scuffing a surface of the motherboard 102 and other component members attached to the surface thereof. Moreover, a majority of the cases 101 are fabricated from metal components, which results in many metallic angles being formed in the interior of the case 101, hence, during the course of assembly, any slight inadvertent movement by the installer can extremely easily result in scratching of the hands of the installer, or inadvertently scuffing the motherboard during the course of assembling the motherboard.

SUMMARY OF THE INVENTION

In light of the aforementioned problems, the inventor of the present invention has implemented research to improve the structure of a host computer case that better meets needs when assembling a case of a host computer.

A primary objective of the present invention is to provide a motherboard fixing device that enables rapid and convenient assembling of a motherboard, and effectively prevents damage to the motherboard during the course of assembling.

The motherboard device of the present invention is installed within a case of a host computer, whereafter a side of the case forms an insertion groove of appropriate depth, and a plurality of elastic catch devices are located on a side wall of the insertion groove. Furthermore, a plurality of position fixing points are located on another corresponding side wall, and the present invention further provides a retaining panel. A plurality of assembly holes and position fixing holes are formed on the retaining panel, wherein the assembly holes enable a motherboard to be assembled to the retaining panel, and after assembly, the retaining panel and the motherboard form an integrated body, which can be inserted into the insertion groove. Moreover, after inserting the retaining panel having the motherboard assembled thereon, the position fixing holes are aligned with the corresponding position fixing points. Design of the present invention primarily provides for initial assembly of a motherboard to the retaining panel, whereafter the integrated retaining panel and motherboard can be quickly fixed within the case using an inserting method, thereby effectively preventing inadvertent scuffing of the motherboard when installing, and at the same time improves ease of assembling.

To enable a further understanding of said objectives and the technological methods of the invention herein, brief description of the drawings is provided below followed by detailed description of the preferred embodiments.

BRIEF DESCRIPTION OF THE DRAWINGS

FIG. 2A shows a partially enlarged schematic view of a motherboard fixing device according to the present invention.

FIG. 3A shows a partially enlarged schematic view of retaining members of the motherboard fixing device according to the present invention.

FIG. 3B shows a partially enlarged schematic view of retaining members of the motherboard fixing device according to the present invention.

DETAILED DESCRIPTION OF THE PREFERRED EMBODIMENTS

Figure 1:
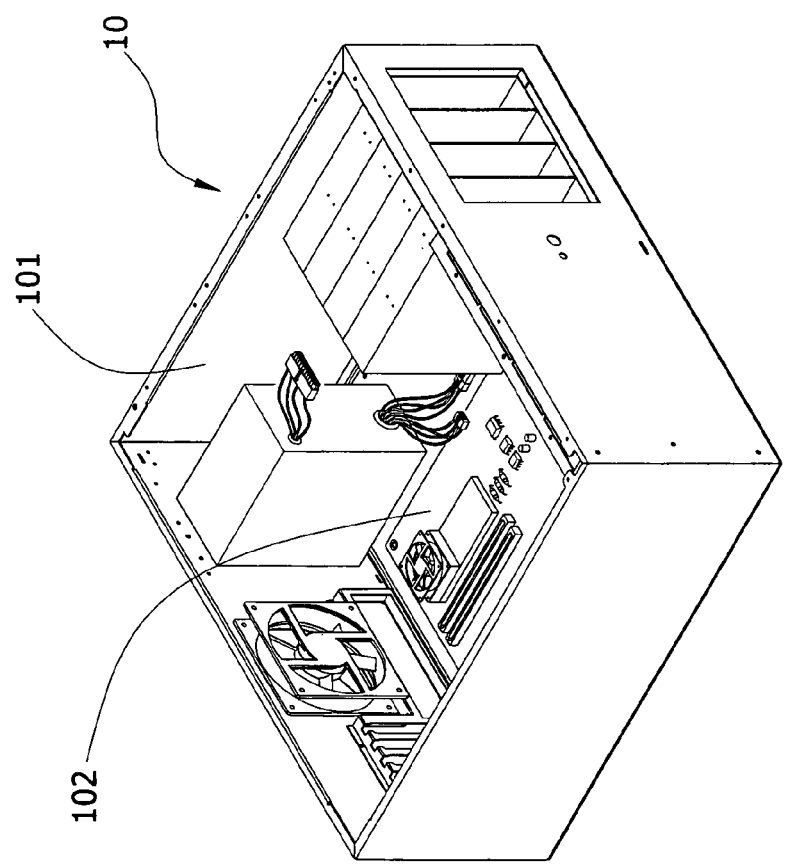
FIG. 1 shows a schematic view of a host computer of prior art.
Figure 2:
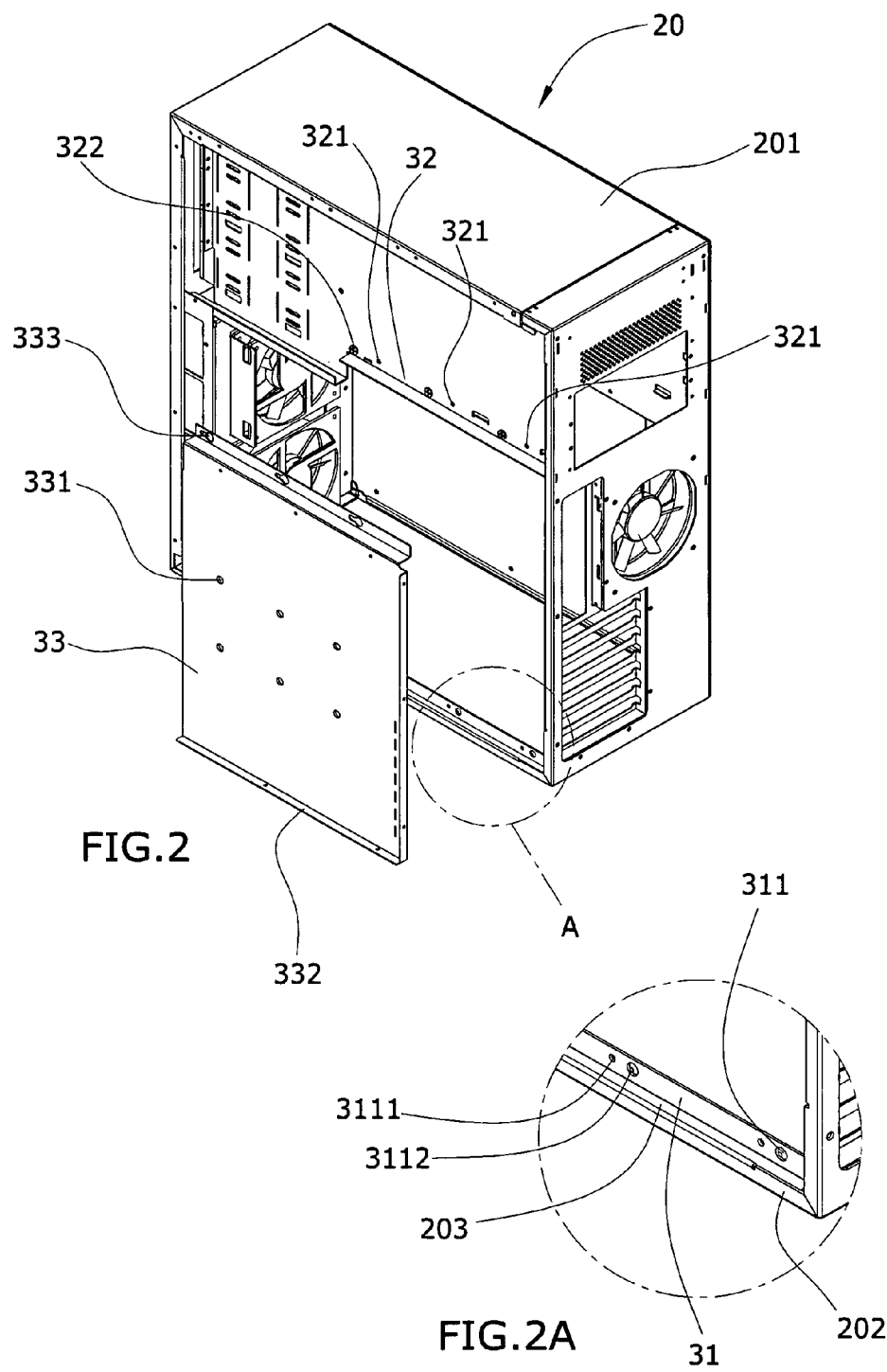
FIG. 2 shows an external elevational view of a motherboard fixing device according to the present invention.

Referring to FIG. 2 and FIG. 2A, which show external elevational views of an embodiment of a motherboard fixing device of the present invention, wherein a motherboard fixing device installed within a case 201 of a host computer 20 primarily comprises a lower retaining wall 31, an upper retaining wall 32 and a retaining panel 33. The lower retaining wall 31 is installed to a bottom surface of the case 201, and position of installation is close to a side 202 of the case 201, thereby forming an insertion groove 203 with the side 202 after completing the installation, and depth of the insertion groove 203 is the same as height of the lower retaining wall 31. Furthermore, a plurality of elastic catch devices 311 are configured on a surface of the lower retaining wall 31. A fixing end 3111 fixed to the surface of the lower retaining wall 31 is located at an end of each of the catch devices 311, and another end forms a protruding point 3112. After fixing the fixing ends 3111, the protruding points 3112 protrude within the insertion groove 203 to an appropriate distance, and applying force to the protruding points 3112 causes an elastic displacement thereof towards the exterior of the insertion groove 203. Furthermore, because the fixing ends 3111 are already fixed, thus, the protruding points 3112 are provided with a restoring counterforce toward the interior of the insertion groove 203. Referring again to FIG. 2 and FIG. 2A, the upper retaining wall 32 is installed to or directly formed with above the lower retaining wall 31, and position of the upper retaining wall 32 is relative to that of the lower retaining wall 31. A plurality of catch devices 321 are located on an upper portion of the upper retaining wall 32, function of which is identical to that of the catch devices 311 on the surface of the retaining wall 31. Furthermore, a plurality of position fixing points 322 are configured close to area of the catch devices 321, and the plurality of position fixing points 322 protrude out from a surface of the upper retaining wall 32, thereby enabling fastening down with screws or riveting together using rivets to complete assembly. The retaining panel 33 independently forms a plate, and a plurality of assembly holes 331 are defined in a surface of the retaining panel 33, and the plurality of assembly holes 331 enable assembling a motherboard (not shown in FIG. 2 and FIG. 2A). Furthermore, a bottom edge of the retaining panel 33 is bent to form an assembling portion 332 of appropriate width, and a plurality of keyhole shaped position fixing holes 333 are formed in an upper edge of the retaining panel 33.

Figure 3:
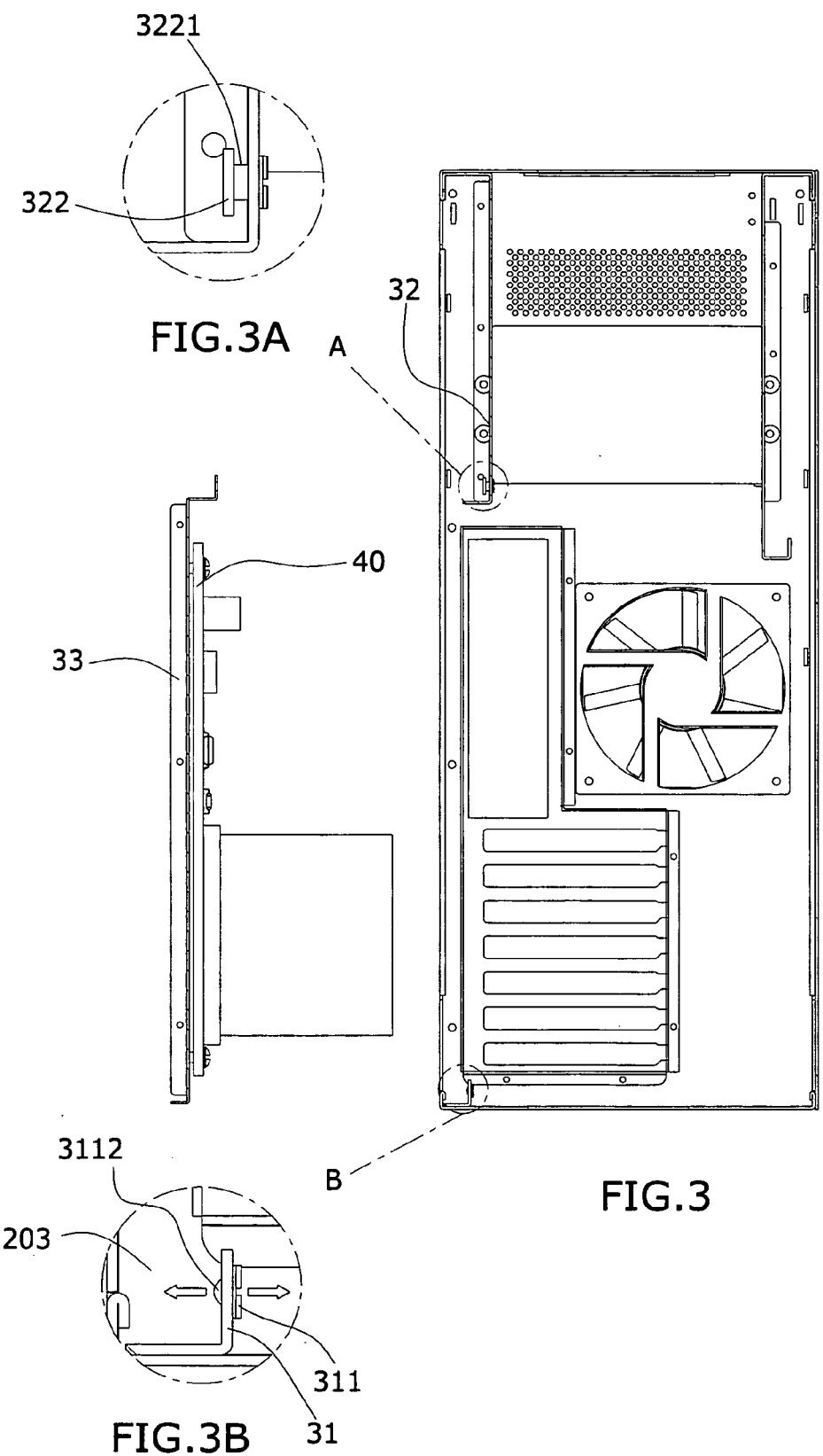
FIG. 3 shows a schematic view of retaining members of the motherboard fixing device according to the present invention.

Referring to FIG. 3, FIG. 3A, and FIG. 3B, which show enlarged schematic views of structural members of the motherboard fixing device of the present invention, wherein after completing disposition of the catch devices 311 of the lower retaining wall 31, the protruding points 3112 protrude within the insertion groove 203, and applying force enables effecting an elastic displacement thereto. Referring again to FIG. 3, FIG. 3A, and FIG. 3B, the position fixing points 322 configured on the upper retaining wall 32 protrude out the surface of the upper retaining wall 32 after completing disposition thereof. Recesses 3221 formed after disposition of the position fixing points 322 enable mutually assembly with the position fixing holes 333 of the retaining panel 33. Referring again to FIG. 3, FIG. 3A, and FIG. 3B, the retaining panel 33 enables assembling a motherboard 40 to the surface thereof, and after assembling the motherboard 40, other peripheral interface card devices can then be consecutively inserted within insertion grooves provided by the motherboard 40.

Figure 4:
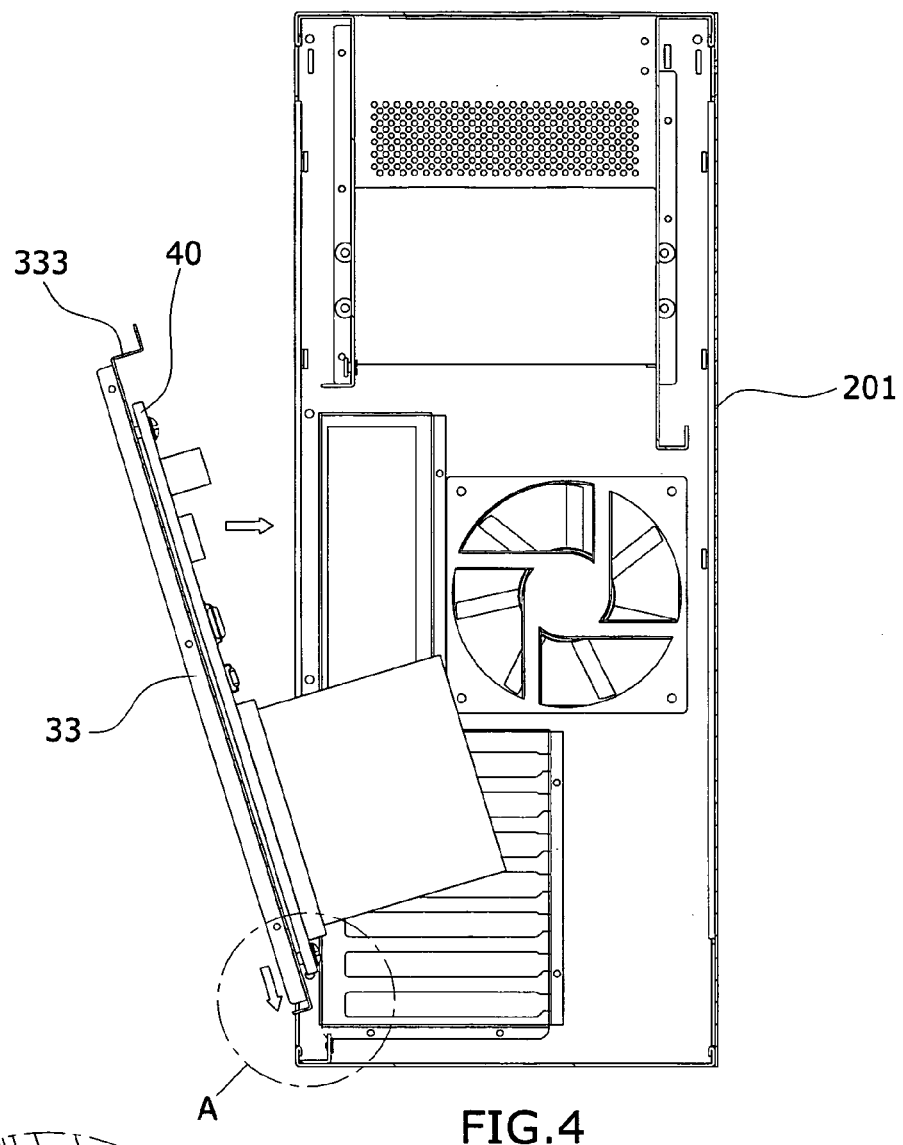
FIG. 4 shows a schematic view of the first embodiment of the motherboard fixing device according to the present invention.
Figure 4A:
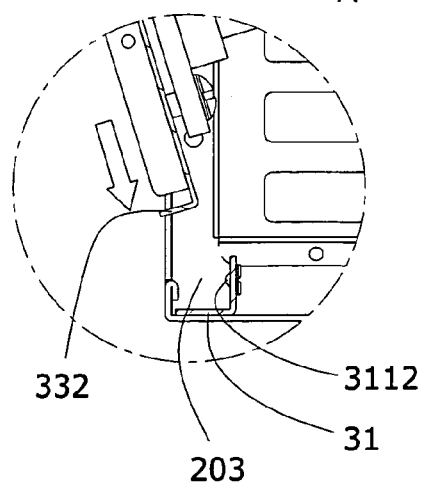
FIG. 4A shows a partially enlarged schematic view of the first embodiment of the motherboard fixing device according to the present invention.

Referring to FIG. 4, and FIG. 4A, which show schematic views of the first embodiment according to the present invention, wherein a completed assembly of the retaining panel 33 and the motherboard 40 forms an integrated body, and after the motherboard 40 has been fixed to the retaining panel 33, then the retaining panel 33 needs only be assembled to the case 201 to complete assembly. When assembling, the bottom edge of the retaining panel 33 (that is, the assembling portion 332) is first inserted into the insertion groove 203, thereby enabling the assembling portion 332 to fall exactly into the insertion groove 293, whereupon the surface of the retaining panel 33 presses down on each of the catch devices 311 on the surface of the lower retaining wall 31, and because each of the catch devices 311 are provided with an elastic property, thus, a clamping effect is formed at the bottom edge of the retaining panel 33.

Figure 5:
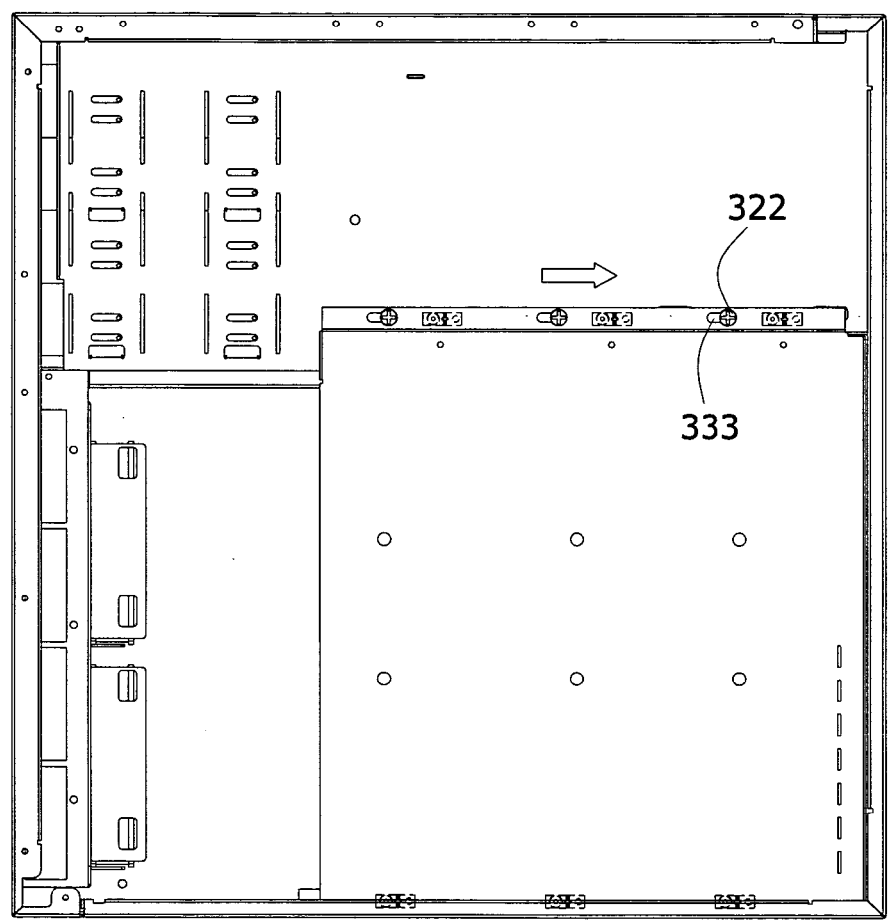
FIG. 5 shows a schematic view of the second embodiment of the motherboard fixing device according to the present invention.
Figure 6:
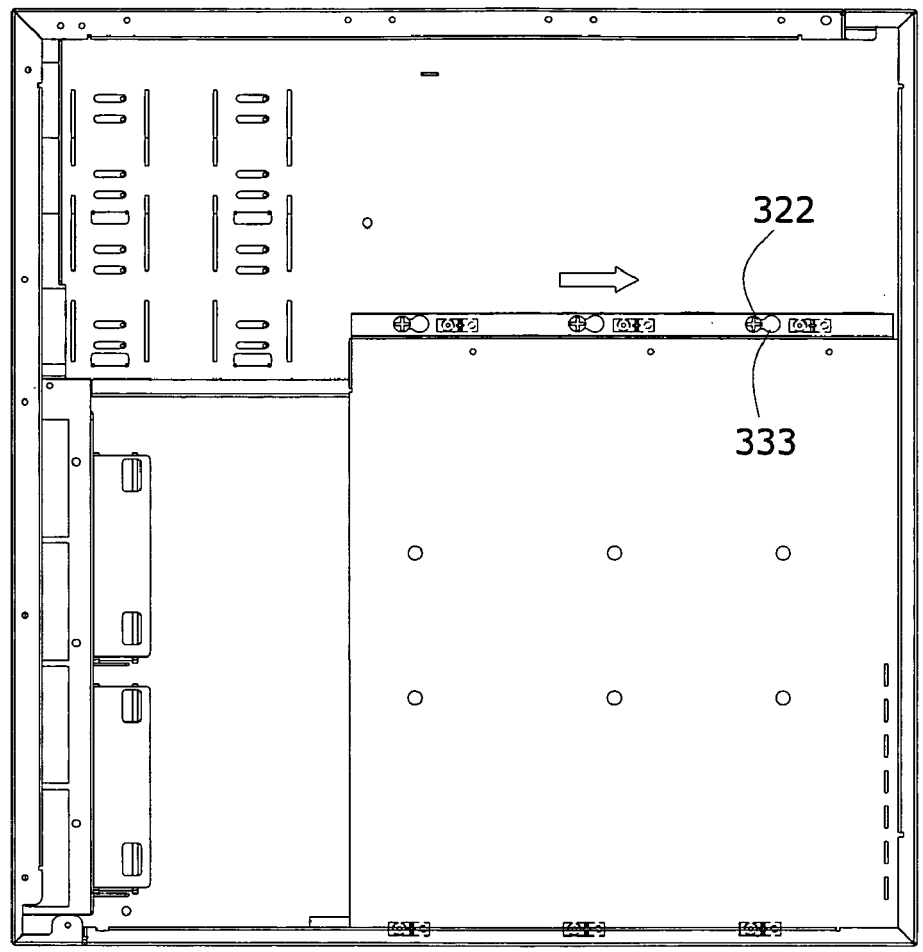
FIG. 6 shows a schematic view of the third embodiment of the motherboard fixing device according to the present invention.

Referring to FIG. 5, which shows a schematic view of the second embodiment of the motherboard fixing device according to the present invention, wherein after disposition of the bottom edge (that is, the assembling portion 332) of the retaining panel 33, each of the position fixing holes 333 of the upper edge of the retaining panel 33 can mount exactly on each of the position fixing points 322 of the upper retaining wall 32. After an installer has made sure each of the position fixing points 322 of the position fixing holes 333 have been completely fixed, then the retaining panel 33 is transversally pushed to displace the retaining panel 33 sideward, thereby effectively fixing the retaining panel 33, primarily using positional coordination between the position fixing points 322 and the position fixing holes 333, and because the position fixing holes 333 are of keyhole shaped, thus, hole portions having relatively large apertures are respectively presented to the position fixing points 322 when the position fixing holes 333 are first mounted thereon. When the user transversally pushes the retaining panel 33, then hole portions of relatively small aperture of the position fixing holes 333 are pushed towards the position fixing points 322, as depicted in FIG. 3, FIG. 3A, and FIG. 3B, and the recesses 3221 of the position fixing points 322 are used to fixedly clasp the retaining panel 33 to achieve fixing effectiveness thereof. After the retaining panel 33 has been fixedly clasped, as shown in FIG. 6 depicting a schematic view of the third embodiment according to the present invention, wherein after fixedly positioning the retaining panel 33 using the position fixing points 322, then the position fixing points 322 are positioned with the relatively small hole portions of the position fixing holes 333.

According to the aforementioned description, it can be appreciated that the motherboard fixing device of the present invention primarily provides for initial assembly of a motherboard to the retaining panel 33, whereupon an inserting method is used to dispose the retaining panel 33 to the case 201 of the host computer 20 to complete assembly. Accordingly, an installer can first complete assembly of the motherboard and related interface cards outside the case 201, whereupon the entire retaining panel 33 can be assembled to the case 201, and finally, the installer can implement connecting of wiring, transmission wires, and so on, thereby effectively preventing damage to the motherboard during the course of assembling and disassembling, moreover, assembly space is not restricted by the computer case 201.

In conclusion, according to the aforementioned embodiments, the motherboard fixing device of the present invention assuredly achieves the objectives of enabling convenient and fast installation of a motherboard and effectively preventing the motherboard from being damaged during the course of assembly. Furthermore, effectiveness, practicability and advancement of the motherboard fixing device of the present invention clearly comply with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A motherboard fixing device for removably fixing a motherboard to a case of a host computer, the motherboard fixing device comprising:
   a) a lower retaining wall connected to a bottom surface of the case and forming an insertion groove, the lower retaining wall having a plurality of lower catch devices located on a surface thereof;
   b) an upper retaining wall connected to the case above the lower retaining wall and having a plurality of upper catch devices and a plurality of position fixing points located on a surface thereof; and
   c) a retaining panel having:
      i) an assembling portion located on a bottom edge thereof; and
      ii) a plurality of position fixing holes located on an upper edge thereof, the mother board is directly connected to the retaining panel,
   wherein, when the motherboard fixing device is connected to the case, the assembling portion of the retaining panel is inserted into the insertion groove formed by the lower retaining wall, one of the plurality of position fixing points is inserted through each of the plurality of position fixing holes,
   wherein the motherboard fixing device is selectively movable between locked and unlocked positions by sliding the retaining panel between first and second positions relative to the plurality of position fixing points, when the motherboard fixing device is located in the unlocked position, the retaining panel is located in the first position and one of the plurality of position fixing points is located in a larger portion of each of the plurality of position fixing holes, and when the motherboard fixing device is located in the locked position, the retaining panel is located in the second position and a smaller portion of one of the of the plurality of position fixing holes is inserted into a recess of each of the plurality of position fixing points.

2. The motherboard fixing device according to claim 1, wherein each of the plurality of lower catch devices and the plurality of upper catch devices has a fixing end and a protruding point, each fixing end is connected to a flat surface and each protruding point protrudes outwardly from the flat surface.

3. The motherboard fixing device according to claim 1, wherein each of the plurality of position fixing holes located on the retaining panel has a keyhole shape.

* * * * *